US011686966B2

(12) United States Patent
Yerkeyev

(10) Patent No.: US 11,686,966 B2
(45) Date of Patent: Jun. 27, 2023

(54) BUSBAR ANCHORING SYSTEM AND METHOD FOR PDLC FILMS

(71) Applicant: SWITCHBLE LLC, Miami, FL (US)

(72) Inventor: Anton Yerkeyev, Miami, FL (US)

(73) Assignee: Switchble LLC, Fort Lauderdale, FL (US)

( * ) Notice: Subject to any disclaimer, the term of this patent is extended or adjusted under 35 U.S.C. 154(b) by 0 days.

(21) Appl. No.: 17/800,475

(22) PCT Filed: Aug. 30, 2021

(86) PCT No.: PCT/US2021/048260
§ 371 (c)(1),
(2) Date: Aug. 17, 2022

(87) PCT Pub. No.: WO2023/033787
PCT Pub. Date: Mar. 9, 2023

(65) Prior Publication Data
US 2023/0129768 A1 Apr. 27, 2023

(51) Int. Cl.
G02F 1/1334 (2006.01)
G02F 1/1333 (2006.01)

(52) U.S. Cl.
CPC .......... *G02F 1/1334* (2013.01); *G02F 1/1333* (2013.01); *G02F 2202/28* (2013.01)

(58) Field of Classification Search
CPC .. G02F 1/1334; G02F 2202/28; G02F 1/1333; G02F 1/13452
See application file for complete search history.

(56) References Cited

U.S. PATENT DOCUMENTS

| | | | |
|---|---|---|---|
| 5,886,763 A | 3/1999 | Wolkowicz et al. | |
| 7,179,535 B2 | 2/2007 | Fisher | |
| 8,441,707 B2 | 5/2013 | Lam et al. | |
| 8,717,658 B2 | 5/2014 | Bergh et al. | |
| 9,196,949 B2 | 11/2015 | Droste et al. | |
| 9,229,261 B2 | 1/2016 | Schwartz et al. | |
| 9,500,888 B2 | 11/2016 | Schwartz et al. | |
| 9,568,799 B2 | 2/2017 | Lam et al. | |
| 10,760,334 B2 | 9/2020 | Agrawal et al. | |
| 10,901,284 B2 | 1/2021 | Turner et al. | |
| 2002/0089638 A1 | 7/2002 | Ho et al. | |
| 2005/0175827 A1 | 8/2005 | Hebrink et al. | |
| 2011/0267673 A1* | 11/2011 | Agrawal | G02F 1/155 977/932 |
| 2018/0173035 A1 | 6/2018 | Port et al. | |
| 2018/0233616 A1 | 8/2018 | Rotto | |
| 2019/0317344 A1* | 10/2019 | Meshkat Mamalek | G02F 1/137 |
| 2020/0057347 A1 | 2/2020 | Telfer et al. | |

(Continued)

Primary Examiner — Jia X Pan
(74) Attorney, Agent, or Firm — Mark C. Johnson; Johnson Dalal

(57) ABSTRACT

A busbar anchoring system and method for polymer dispersed liquid crystal (PDLC) film layup that includes a plurality of mesh anchors with at least one of the plurality of electrically conductive mesh anchors interposed between and adhesively coupled to a first strip along a first section of the PDLC film layup formed by at least one of two indium tin oxide (ITO) layers flanking a PDLC layer and with at least one of the plurality of mesh anchors interposed between and adhesively coupled to a second strip along a second section of the PDLC film layup and the at least one of the two ITO layers.

14 Claims, 9 Drawing Sheets

(56) References Cited

U.S. PATENT DOCUMENTS

2021/0242674 A1\* 8/2021 Manz .................. H01B 5/14
2021/0268774 A1\* 9/2021 Klein ............... B32B 17/10513

\* cited by examiner

BUSBAR ANCHORING SYSTEM AND METHOD FOR PDLC FILMS

FIELD OF THE INVENTION

The present invention relates generally to busbars or electrodes for film layers and, more particularly, relates to anchoring systems and methods for anchoring busbars associated with film layers having polymer dispersed liquid crystals ("PDLCs").

BACKGROUND OF THE INVENTION

Many users desire privacy for a room or other occupied area, and one method of creating that privacy includes utilization of a privacy film layer superimposed (e.g., laminated, adhered, etc.) or otherwise coupled with or to a piece of transparent or translucent glass or other material. These privacy films are often referred to as "switchable" films or "smart" films, and are capable of adjusting light transmission between transparent and opaque upon being subjected to an electrical current. Many of these films include functionality such as light adjustment, UV and infrared blocking, advertising, and security. Most of the film applications are via glass, acrylic, or polycarbonate laminates, mainly having to do with the voltage (e.g., approximately between 24 VAC and 110 VAC) required to operate the film. One of the advantages of smart films is that they eliminate the need for blinds, shades, or window treatments.

Most of these privacy films utilize PDLCs. As seen in FIG. 1, these PDLC films may be capable of adjusting light transmission through the application of an AC power source. The active component in PDLC films includes liquid crystal microdroplets 100 which are suspended in a polymer matrix that is surrounded by a conductive coating 104 and a polymer (e.g., PET) film 106. As shown to the right in FIG. 1, the natural state of the film sees the PDLC molecules 100 arranged in a way that causes light waves to refract through and reflect away from the surface, distorting the state of the glass to present as frosted. As shown to the left in FIG. 1, when an electrical current is passed through the PDLC layer 102, the liquid crystal molecules 100 polarize, allowing light to pass through. Said another way, without power, the liquid crystal molecules (microdroplets) 100 are disordered. This prevents light from penetrating the film, rendering it opaque. When power is applied to the smart film the liquid crystal molecules 100 are forced into alignment, rendering it transparent. Therefore, the switchable self-adhesive film allows users to have instant privacy or solar control and is often designed specifically to retrofit existing transparent glass surfaces.

These privacy films utilize "busbars", or an electrically conductive rod(s), bar(s), or strip(s) configured to provide the electrical current to or act as charging points to the privacy films. In relation to switchable privacy glass, the busbar is a conductive copper strip applied to one or two edges of the sheet of PDLC film prior to it being laminated between two panels of glass. Many of these busbars are located on opposite sides of the film (i.e., having a positive side and a negative side). These busbars typically consist of copper tape adhered to a lead (wire), e.g., a 20-gauge wire 202, as depicted in FIG. 2. However, many of these busbars fail to adhere or otherwise couple to the film over prolonged periods of time and/or when subjected to harsh environmental conditions, e.g., vibration, weather, etc. For example, condensation may occur on a surface of a piece of glass exposed to an exterior environment, resulting in copper oxidation and PDLC film failure due to busbar disconnection from a conductive layer (e.g., an indium tin oxide ("ITO") layer) of the PDLC.

Therefore, a need exists to overcome the problems with the prior art as discussed above.

SUMMARY OF THE INVENTION

The invention provides a busbar anchoring system and method for PDLC films that overcomes the hereinaforementioned disadvantages of the heretofore-known devices and methods of this general type and that effectively and efficiently generates an anchor or support the busbar on a PDLC film. Specifically, the anchor mechanically and electrically couples an electrically conductive tape or strip on a switchable smart film or PDLC film to the film, wherein the anchor may include a copper mesh and conductive silver (or other electrically conductive) adhesive configured to adhere a copper busbar/electrode/copper tape to a conductive, e.g., ITO layer, on the PDLC film.

With the foregoing and other objects in view, there is provided, in accordance with the invention, that includes a PDLC film layup having an outer layup surface, an inner layup surface opposing the outer layup surface, a perimeter edge surrounding the outer and inner layup surfaces, a PDLC layer interposed between two conductive ITO layers, a first strip of an electrically conductive material and adhesively and electrically conductively coupled to at least one of the two ITO layers and the PDLC layer, a second strip of an electrically conductive material adhesively and electrically conductively coupled to the at least one of the ITO layers and the PDLC layer, and that is operably configured to selectively modulate the transparency through the PDLC film layup. The invention includes a busbar anchoring system having a plurality of electrically conductive mesh anchors with at least one of the plurality of mesh anchors interposed between and adhesively coupled to the first strip along a first section of the PDLC film layup and the at least one of the two ITO layers and with at least one of the plurality of mesh anchors interposed between and adhesively coupled to the second strip along a second section of the PDLC film layup and the at least one of the two ITO layers.

In accordance with a further feature, the plurality of mesh anchors are each adhesively coupled to the first and second strips respectively, and the at least one of the two ITO layers with an electrically conductive adhesive.

In accordance with yet another feature, the electrically conductive adhesive is made of silver.

In accordance with another feature, an embodiment of the present invention includes the busbar anchoring system having an electrically conductive ink layer directly and continuously superimposed over PDLC layer and on the first section of the film layup and the second section of the film layup, the conductive ink layer having the plurality of mesh anchors directly superimposed and adhesively coupled thereto with the electrically conductive adhesive.

In accordance with yet another feature, an embodiment of the present invention also includes the first and second strips each having a strip length separating opposing ends thereon and a strip width separating an upper edge and lower edge thereon, wherein the plurality of mesh anchors each have an anchor width substantially equal to the strip width and are discontinuously dispersed along the respective strip length.

In accordance with yet another feature, the plurality of mesh anchors are of a copper material and the first and second strips are of a copper material and include an outer strip surface and an inner strip surface with an adhesive material disposed thereon.

In accordance with an additional feature, the first and second strips are spatially uncoupled to one another.

In accordance with yet another feature, an embodiment of the present invention also includes a positive lead wire directly and electrically coupled to the outer strip surface of the first strip and a negative lead wire directly and electrically coupled to the outer strip surface of the second strip.

In accordance with a further feature, an embodiment of the present invention also includes a plurality of the plurality of mesh anchors disposed along the first section of the film layup approximately 50-76 cm apart from one another and a plurality of the plurality of mesh anchors disposed along the second section of the film layup approximately 50-76 cm apart from one another.

In accordance with yet another feature, an embodiment of the present invention also includes a polymer adhesive layer defining the inner layup surface, wherein the first and second strips both define a portion of the outer layup surface.

Also in accordance with the present invention, a method of anchoring a busbar to a PDLC film layup is disclosed that includes the steps of providing a PDLC film layup having an outer layup surface, an inner layup surface opposing the outer layup surface, a perimeter edge surrounding the outer and inner layup surfaces, and a PDLC layer interposed between two conductive indium tin oxide (ITO) layers, along with the step of removing a strip of at least one of the two ITO layers proximal to the perimeter edge of the PDLC film layup to define a first section of the film layup and a second section of the film layup to expose the PDLC layer. Further, the method may include applying an electrically conductive adhesive material onto and in disproportionately length portions with respect to the first and second sections of the film layup and superimposing and directly coupling a plurality of mesh anchors to the disproportionally length portions of the electrically conductive adhesive material applied to the first and second sections of the film layup. Additionally, the method may include superimposing, directly coupling, and adhesively coupling a first strip of an electrically conductive material to the first section of the film layup and superimposing, directly, and adhesively coupling a second strip of an electrically conductive material to the second section of the film layup. Further, the method may include directly coupling a positive lead wire to an outer strip surface of the first strip and a negative lead wire to an outer strip surface of the second strip.

In accordance with yet another feature, an embodiment of the present invention also includes removing excess liquid crystals from the first and second sections with an abrasive cloth material and removing the strip of the at least one of the two ITO layers, having a uniform strip width of approximately 5 mm, to define the first and second sections of the film layup.

In accordance with yet another feature, an embodiment of the present invention also includes applying an electrically conductive ink layer to the exposed PDLC layer and on the first and second sections of the film layup.

Although the invention is illustrated and described herein as embodied in a busbar anchoring system and method for PDLC films, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one.

The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the busbar(s), or from one side edge to another side edge of the film layup, wherein "lateral" or "width" should be understood to mean in a direction opposite the longitudinal direction and/or from one lower edge to an upper edge of the film layup.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
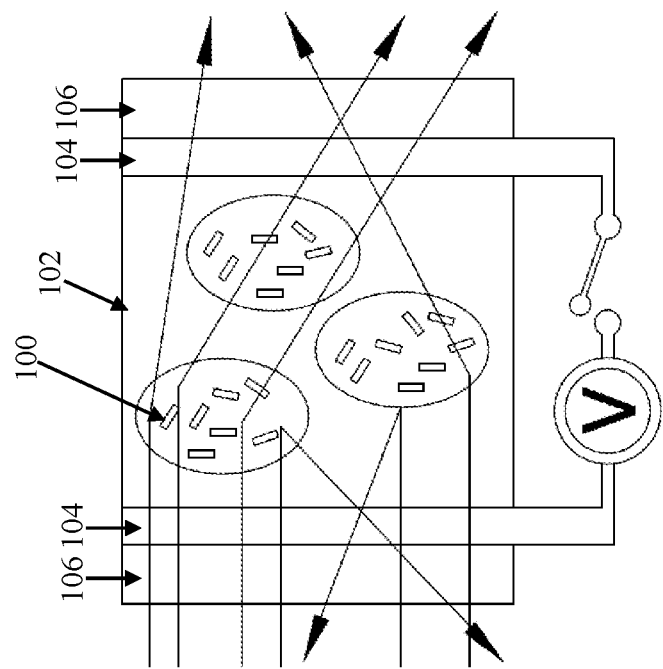
FIG. 1 depicts schematic views of a PDLC film layer in its natural state and dynamic state activating the liquid crystals within a polymeric matrix of the PDLC film when power is applied thereto.
Figure 1:
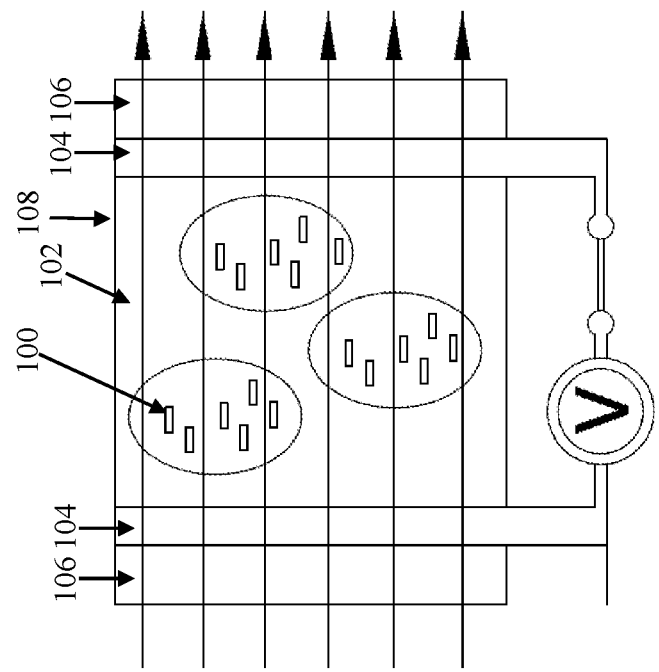

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
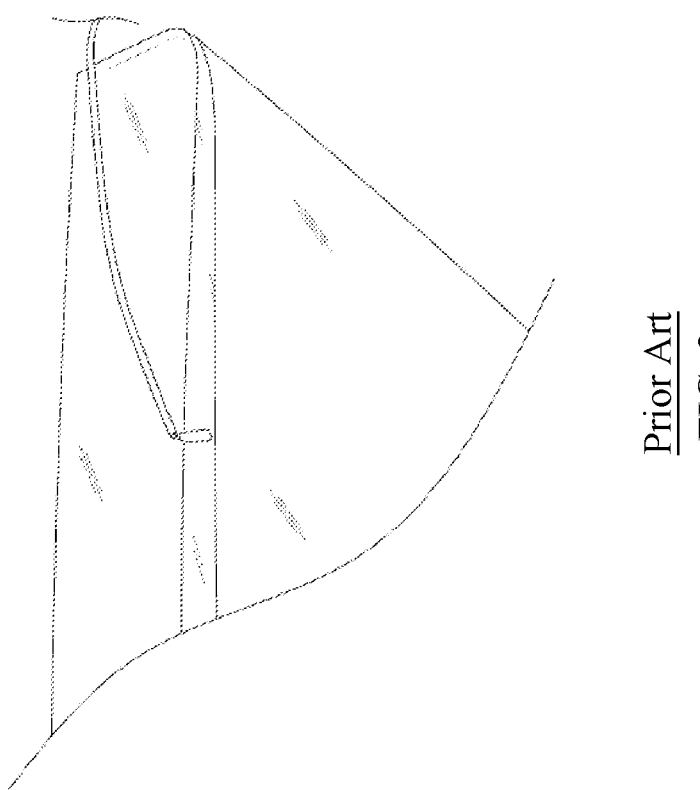
FIG. 2 is a perspective view of a prior-art busbar having a copper tape adhered to a lead wire.
Figure 4:
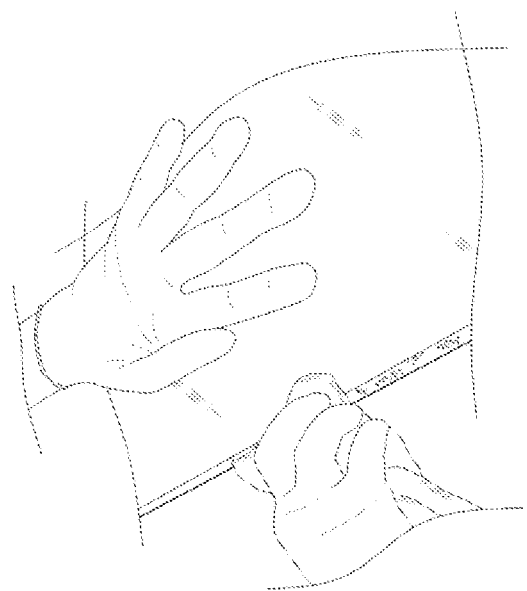
FIG. 4 is a perspective view of a user removing excess liquid crystals from first and second sections with an abrasive cloth material after the user has removed the strip of the ITO layer in accordance with one embodiment of the present invention.

The present invention provides a novel and efficient busbar anchoring system that prevents or otherwise inhibits degradation or disconnection of a busbar utilized with a PDLC film layup. As seen in FIGS. 1-2, a conventional and known PDLC film layup 200 with a lead wire 202 coupled thereto is shown. As known in the art, the PDLC film layup 200 includes a PDLC layer 108 interposed between two conductive layers 104 typically of an indium tin oxide (ITO) material. The PDLC film layup 200 may be operable to run on 48 V, 60 Hz, and 0.01 A/ft$^2$. The PDLC film layup 200 is flexible and may be flanked and coupled with an intermediate layer of material laminated between two pieces of glass or flanked and coupled with a protective film or layer on one side and an adhesive and protective film or layer on the opposite side of the ITO layer. In the latter configuration, the protective layer may be removable, thereby exposing the adhesive for coupling to an exterior or interior surface of a piece of glass. The protective film may be of a polyester (PET) material that may be die cut or laser cut to correspond with the shape and size of the PDLC film layup. In an exemplary embodiment, the present invention works at approximately between 48 VAC and 55 VAC.

Figure 15:
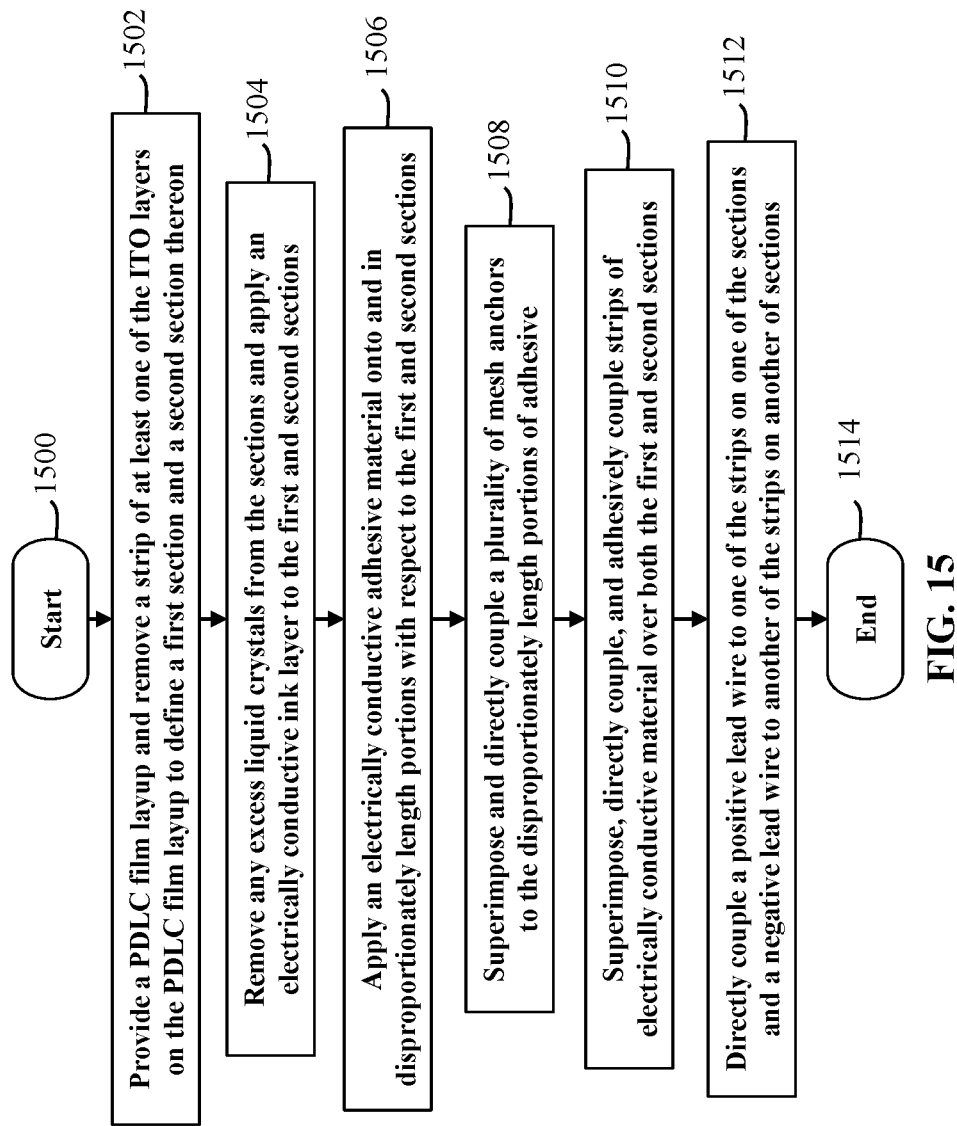
FIG. 15 is a process-flow diagram depicted a method of anchoring a busbar to PDLC film layup in accordance with one embodiment of the present invention.

Referring now to FIGS. 3-14, one embodiment of the present invention is shown in different steps along the process of anchoring a busbar 1204 to a PDLC film layup 300, like the one depicted in FIG. 1. FIGS. 3-14 show several advantageous features of the present invention, but, as will be described below, the invention can be provided in several shapes, sizes, combinations of features and components, and varying numbers and functions of the components. Moreover, FIGS. 3-14 will be described in conjunction with the process flow chart of FIG. 15. Although FIG. 15 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 15 for the sake of brevity. In some embodiments, some or all of the process steps included in FIG. 15 can be combined into a single process.

Figure 3:
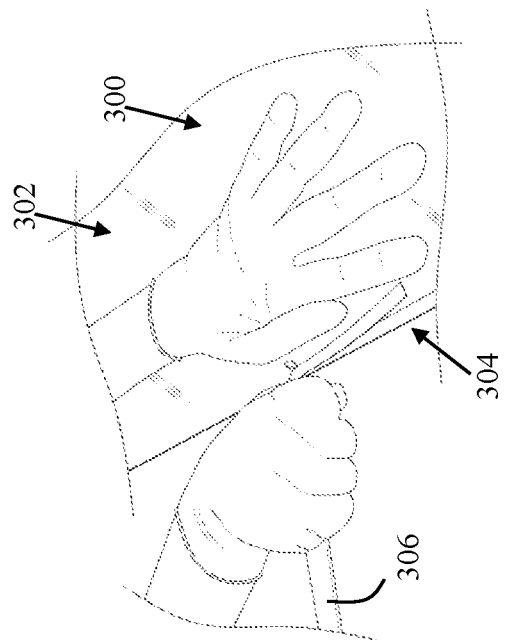
FIG. 3 is a perspective view of a user removing a strip of an ITO layer proximal to the perimeter edge of the PDLC film layup in accordance with one embodiment of the present invention.
Figure 6:
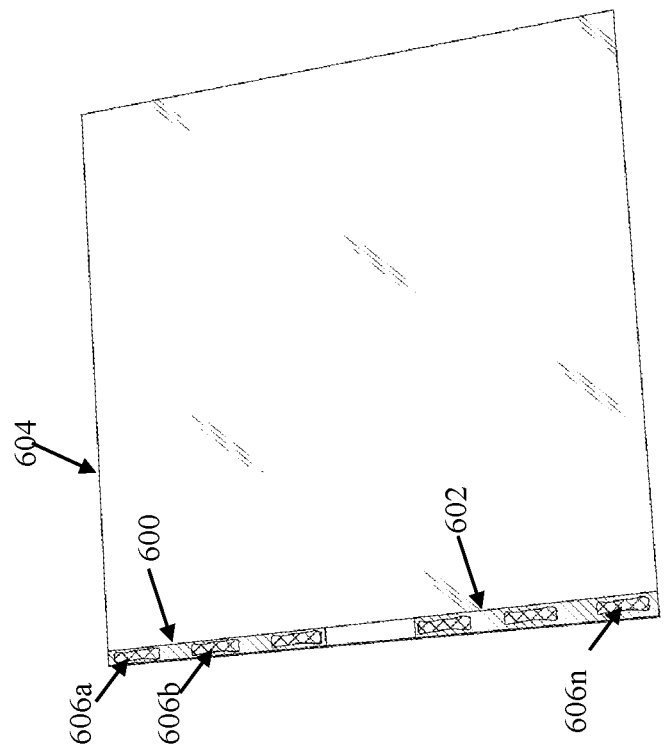
FIG. 6 is a perspective view of a user applying electrically conductive adhesive material onto and in disproportionally length portions with respect to the first and second sections of the film layup in accordance with one embodiment of the present invention.
Figure 5:
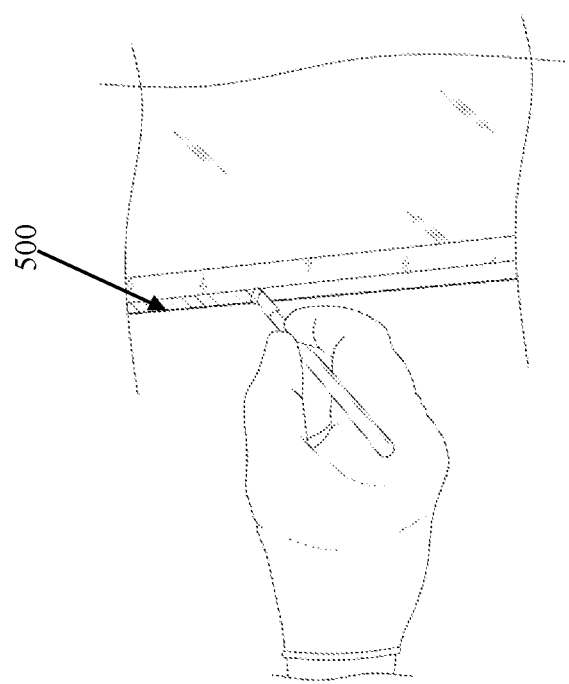
FIG. 5 is a perspective view of a user applying a conductive ink layer to the first and second sections in accordance with one embodiment of the present invention.
Figure 12:
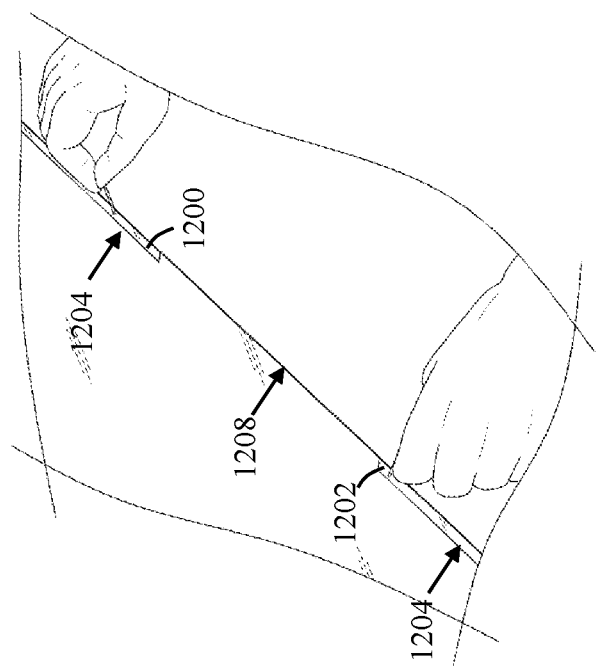
FIG. 12 is a perspective view of a user testing the PDLC film layup by applying a positive and negative charge to the anchored busbar of the PDLC film layup in accordance with one embodiment of the present invention.
Figure 11:
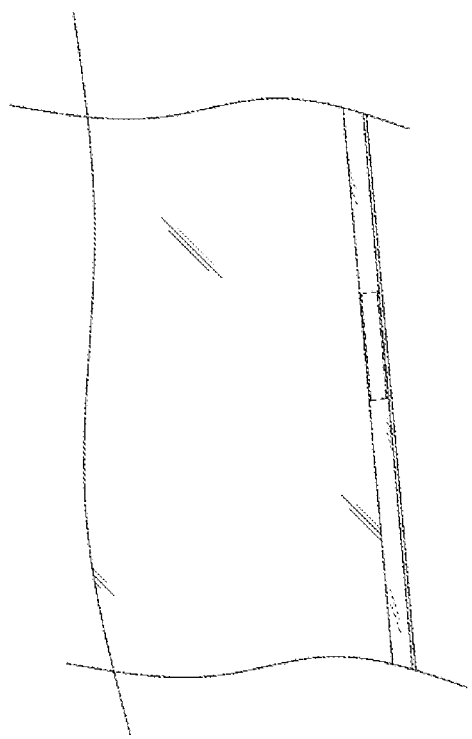
FIG. 11 is a perspective view of a PDLC film layup with an anchor in accordance with one embodiment of the present invention.
Figure 14:
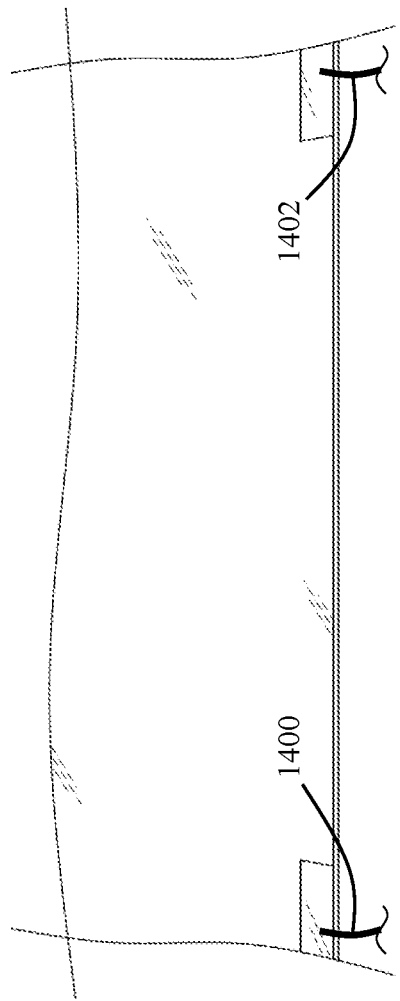
FIG. 14 is a perspective view of lead wires directly coupled to the strips of an electrically conductive material on the first and second sections of the film layup in accordance with one embodiment of the present invention.

With reference to FIG. 3, FIG. 6, and FIG. 12 in combination with FIG. 15, the method of anchoring a busbar 1204 to a PDLC film layup 300 may begin at step 1500 and immediately proceed to step 1502 of providing a PDLC film layup 300 having an outer layup surface 302, an inner layup surface 304 opposing the outer layup surface 302, a perimeter edge 604 surrounding the outer and inner layup surfaces 302, 304, and a PDLC layer 108 interposed between two conductive indium tin oxide (ITO) layers 104. The perimeter edge 604 may form an overall rectangular shape, but other shapes are contemplated. Further, a user may cut a prefabricated PDLC film layup 300 to a desired shape before forming the busbar in accordance with the present invention.

Next, step 1504 may include removing a strip of at least one of the two ITO layers proximal (i.e., at or near, within 10% of the laterally length) to the perimeter edge 604 of the PDLC film layup 300 to define a first section 600 of the film layup 300 and a second section 602 of the film layup 300 to expose the PDLC layer 108. The removed strip preferably removes only a portion of one of the ITO layers 104 and is done by utilizing a blade member 306 (as exemplified in FIG. 3). Preferably, the blade of the blade member 306 is operable, shaped, and sized to remove only a 5 mm strip of material, thereby giving an advantageous surface area for applying the busbar 1204, while minimizing encroachment of the viewable area of the glass. The first and second sections 600, 602 can be beneficially seen continuously spanning away from one of the sides of the perimeter edge 604 and terminating a longitudinal length along the PDLC film layup 300 to define a spatial disconnection 1208 sufficient to prevent the two opposing portions of the busbar 1204 from touching one another. In one embodiment, the removed and defined sections 600, 602 are uniform in width to effectuate a secure electrical connection and coupling with a plurality of mesh anchors 700a-n (wherein "n" represents any number greater than one).

After removal and defining of the sections 600, 602, step 1504 may include removing excess liquid crystals from the first and second sections 600, 602 with, for example, but beneficially, an abrasive cloth material (e.g., cotton, cotton-polyester blend, etc.) that ensures the surface area of the sections 600, 602 is free from any crystals. This step is depicted and exemplified in FIG. 4. Next, with reference to FIG. 1, FIG. 3, and FIG. 5, the process may beneficially include applying an electrically conductive ink layer 500 to the exposed PDLC layer 108 and on the first and second sections 600, 602 of the film layup 300. The ink layer 500 is preferably of a silver-based material to facilitate in enhancing the electrical conductivity. Further, the ink layer 500 beneficially provides a good contact surfaces for subsequent adhesive and the mesh anchors 700a-n, in addition to inhibiting the busbar 1204 from being viewed from the opposing side of the glass when opaque. After application of the electrically conductive ink layer 500, it is permitted to dry and/or cure.

Next, with reference to FIG. 6 in combination with FIG. 15, step 1506 includes applying an electrically conductive adhesive material onto and in disproportionately length portions 606a-n with respect to the first and second sections 600, 602 of the film layup 300. Said differently, the user will apply one or more longitudinally length sections of electrically conductive adhesive on both of the sections 600, 602. Each of the adhesive sections 606a-b may be approximately 25-75 mm in length, separated from any adjacent sections 606a-n and have a width (like the ink layer 500) approximately equal to the width of the sections 600, 602 to which they are applied. Preferably, the electrically conductive adhesive is made of a silver-based material to facilitate in enhancing the electrical conductivity of the busbar with the PDLC layer 108 directly or indirectly through the ITO layers 104.

Figure 8:
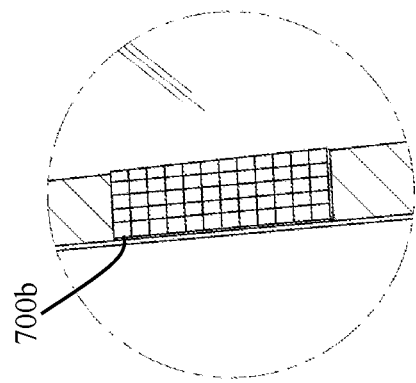
FIG. 8 is a close-up view of section 8 in FIG. 7 and depicts one of the plurality of mesh anchors in accordance with one embodiment of the present invention.
Figure 7:
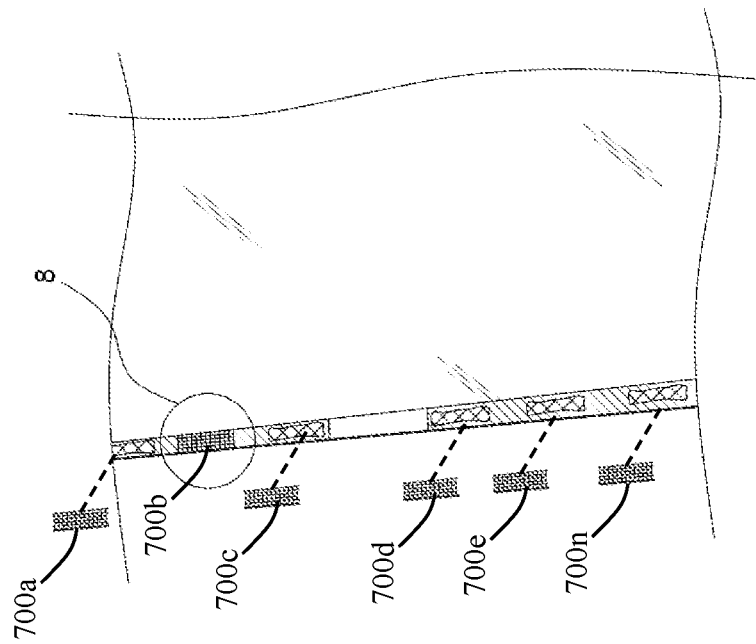
FIG. 7 is a perspective, partially exploded, view of a plurality of mesh anchors superimposed and directly coupled, in disproportionally length portions, to the electrically conductive adhesive material applied to the first and second sections of the film layup in accordance with one embodiment of the present invention.
Figure 10:
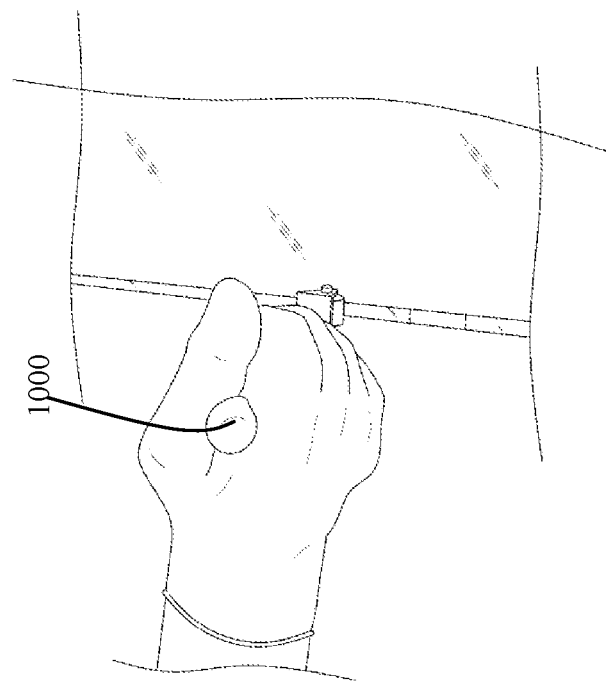
FIG. 10 is a perspective view of a user rolling and applying pressure to one of the strips of an electrically conductive material to one of the first or second section of the film layup in accordance with one embodiment of the present invention.
Figure 9:
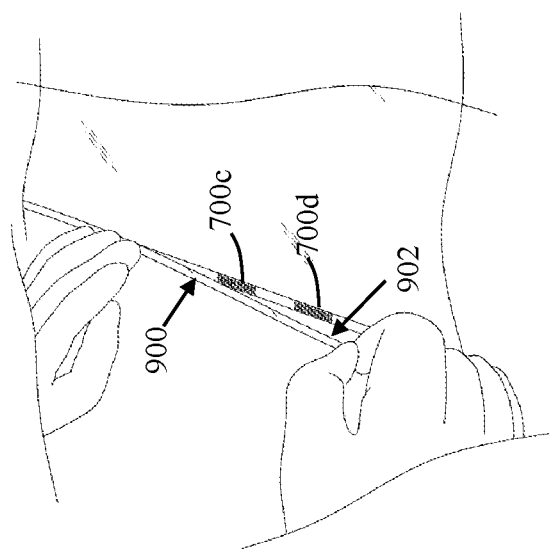
FIG. 9 is a perspective view of a user superimposing, directly coupling, and adhesively coupling one of the strips of an electrically conductive material to one of the first or second section of the film layup in accordance with one embodiment of the present invention.

Next, with reference to FIGS. 7-8, step 1508 includes superimposing and directly coupling a plurality of mesh anchors 700a-n to the disproportionally length portions 606a-n of the electrically conductive adhesive material applied to the first and second sections 600, 602 of the film layup 300. Said differently, the plurality of mesh anchors 700a-n are each adhesively coupled to the first and second strips 1200, 1202 that are applied in the next step 1510, respectively, and the at least one of the two ITO layers 104 with the electrically conductive adhesive. Beneficially, the plurality of mesh anchors 700a-n are of a copper material to facilitate in enhancing the electrical conductivity of the busbar with the PDLC layer 108 directly or indirectly through the ITO layers 104, but other electrically conductive materials may be utilized. As testing has confirmed, the anchors 700a-n are beneficially of a mesh material, e.g., a network of electrically conductive thin gauged wire or thread, to beneficially facilitate in adherence of the busbar 1204 to the PDLC film layup 300 in almost any environmental condition. In one embodiment, the mesh material is of copper wire having a diameter less than approximately 2 mm and are welded or wound together to create openings less than approximately 11 mm. Each of the anchors 700a-n may be approximately 25-75 mm in length, separated from any adjacent sections 606a-n and have a width (like the ink layer 500 and the adhesive portions 606a-n) approximately equal to the width of the sections 600, 602 to which they are applied. Furthermore, in one embodiment, a plurality of the plurality of mesh anchors 700a-n are disposed along the first section 600 of the film layup 300 approximately 50-76 cm apart from one another and a plurality of the plurality of mesh anchors 700a-n disposed along the second section 602 of the film layup 300 approximately 50-76 cm apart from one another, thereby providing a surface area testing has shown provides the best adherence of the strips 1200, 1202 to the sections 600, 602.

Next, and with reference to FIGS. 9-14 in combination with FIG. 15, step 1510 includes superimposing, directly coupling, and adhesively coupling a first strip 1200 of an electrically conductive material to the first section 600 of the film layup 300 and superimposing, directly, and adhesively coupling a second strip 1202 of an electrically conductive material to the first and second sections 600, 602 of the film layup 300. The first strip 1200 is of an electrically conductive material and is adhesively and electrically conductively coupled to at least one of the two ITO layers 104 and the PDLC layer 108 along the first section 600 of the film layup 300. The second strip 1202 is also of an electrically conductive material and is adhesively and electrically conductively coupled to the at least one of the ITO layers 104 and the PDLC layer 108 along a second section 602 of the film layup 300.

Therefore, a beneficial busbar anchoring system is disclosed that includes the plurality of mesh anchors 700a-n interposed between and adhesively coupled to the first strip 1200 and the second strip 1202, and one of the ITO layers 104 and/or PDLC layer 108. The first and second strips 1200, 1202 each include a strip length separating opposing ends thereof and include a strip width separating an upper edge and lower edge thereon, wherein the plurality of mesh anchors 700a-n each have an anchor width substantially equal to the strip width and are discontinuously dispersed along the respective strip length. Said another way, the strips 1200, 1202 are overlaid on the mesh anchors 700a-n such that they completely cover (and chemically and/or mechanically engage with, via pressure and adhesive) the anchors 700a-n and any exposed ink layer 500 or exposed adhesive portions 600a-n.

In one preferred embodiment, the first and second strips 1200, 1202 are of an electrically conductive metallic material, preferably copper, to facilitate in enhancing the electrical conductivity of the busbar with the PDLC layer 108 directly or indirectly through the ITO layers 104. The first and second strips 1200, 1202 may be of another electrically conductive material. Further, the strips 1200, 1202 are flexible (as exemplified in FIG. 9) to enable the user to apply the strips 1200, 1202 over the sections 600, 602. In one embodiment, the strips 1200, 1202 include an outer strip surface 900 and an inner strip surface 902 with an adhesive material disposed thereon, wherein the adhesive on the strips 1200, 1202 beneficially couples to the strips 1200, 1202 to the outer surfaces of the mesh anchors 700a-n and any exposed ink layer 500 on the sections 600, 602. The inner strip surface 902 may also include a liner thereon that would be required to be removed before application onto the sections 600, 602. The first and second strips 1200, 1202 are also spatially uncoupled to one another (preferably on the outer layup surface 302), and rolled with pressure independently and continuously by a user using a roller 1000 (as exemplified in FIG. 10).

The electrically conductive ink layer 500 may be described as being directly and continuously superimposed over PDLC layer and on the first section 600 of the film layup 300 and the second section 602 of the film layup 300, wherein the conductive ink layer 500 has the plurality of mesh anchors 700a-n directly superimposed and adhesively coupled thereto with the electrically conductive adhesive. After the strips 1200, 1202 are applied and secured to the sections 600, 602, the user may test the formed busbar 1204 with positive and negative wires (as exemplified in FIG. 12). When the busbar 1204 is connected, the PDLC film layup is operably configured to selectively modulate the transparency through the PDLC film layer structure. In one embodiment, a polymer adhesive layer defines the inner layup surface 304, wherein the first and second strips 1200, 1202 both define a portion of the outer layup surface 302.

Figure 13:
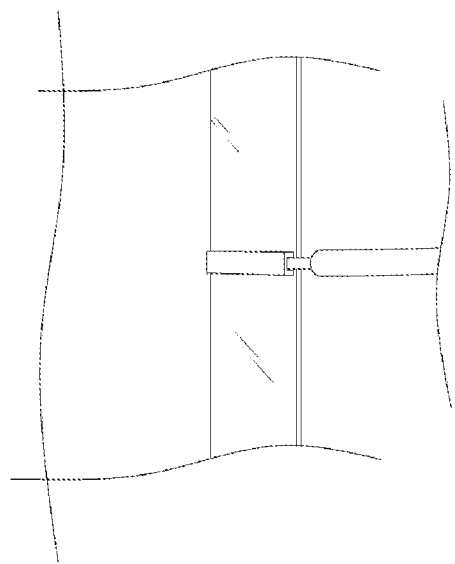
FIG. 13 is a close-up view of a lead wire directly coupled to one of the strips of an electrically conductive material on one of the first or second section of the film layup in accordance with one embodiment of the present invention.

Next, step 1512 includes directly coupling a positive lead wire 1400 to an outer strip surface of the first strip 1200 and a negative lead wire 1402 to an outer strip surface of the second strip 1202. As best depicted in FIG. 13, the lead wires 1400, 1402 may be 20-gauge thickness and may be directly coupled with a staple or other fastener, including a weld. Said another way, a positive lead wire 1400 may be directly and electrically coupled along some portion of the longitudinal length and to the outer strip surface of the first strip 1200 and a negative lead wire directly and electrically coupled along some portion of the longitudinal length and to the outer strip surface of the second strip 1202. The process may terminate or end in step 1514.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. In combination with a polymer dispersed liquid crystal (PDLC) film layup having an outer layup surface, an inner layup surface opposing the outer layup surface, a perimeter edge surrounding the outer and inner layup surfaces, a PDLC layer interposed between two conductive indium tin oxide (ITO) layers, a first strip of an electrically conductive material and adhesively and electrically conductively coupled to at least one of the two ITO layers and the PDLC layer, a second strip of an electrically conductive material adhesively and electrically conductively coupled to the at least one of the ITO layers and the PDLC layer, and operably configured to selectively modulate the transparency through the PDLC film layup, the improvement comprising:
    a busbar anchoring system having a plurality of electrically conductive mesh anchors with at least one of the plurality of mesh anchors interposed between and adhesively coupled, with an electrically conductive adhesive formed from silver, to the first strip along a first section of the PDLC film layup and the at least one of the two ITO layers and with at least one of the plurality of mesh anchors interposed between and adhesively coupled, with an electrically conductive adhesive formed from silver, to the second strip along a second section of the PDLC film layup and the at least one of the two ITO layers; and
    an electrically conductive ink layer directly and continuously superimposed over the PDLC layer and on the first section of the PDLC film layup and the second section of the PDLC film layup, the conductive ink layer having the plurality of mesh anchors directly superimposed and adhesively coupled thereto with the electrically conductive adhesive.

2. The improvement according to claim 1, wherein the first and second strips each further comprise: a strip length separating opposing ends thereon and a strip width separating an upper edge and a lower edge thereon, wherein the plurality of mesh anchors each have an anchor width substantially equal to the strip width and are discontinuously dispersed along the respective strip length.

3. The improvement according to claim 2, wherein: the plurality of mesh anchors are made of a copper material.

4. The improvement according to claim 3, wherein: the first and second strips are made of a copper material and include an outer strip surface and an inner strip surface with an adhesive material disposed thereon.

5. The improvement according to claim 4, wherein:
    the first and second strips are spatially uncoupled to one another.

6. The improvement according to claim 4, further comprising:
    a positive lead wire directly and electrically coupled to the outer strip surface of the first strip and a negative lead wire directly and electrically coupled to the outer strip surface of the second strip.

7. The improvement according to claim 1, further comprising: a plurality of the plurality of mesh anchors disposed along the first section of the PDLC film layup approximately 50-76 cm apart from one another and a plurality of the plurality of mesh anchors disposed along the second section of the PDLC film layup approximately 50-76 cm apart from one another.

8. The improvement according to claim 1, further comprising:
    a polymer adhesive layer defining the inner layup surface, wherein the first and second strips both define a portion of the outer layup surface.

9. A method of anchoring a busbar to a PDLC film layup comprising the steps of:
    providing a PDLC film layup having an outer layup surface, an inner layup surface opposing the outer layup surface, a perimeter edge surrounding the outer and inner layup surfaces, and a PDLC layer interposed between two conductive indium tin oxide (ITO) layers;
    removing a strip of at least one of the two ITO layers proximal to the perimeter edge of the PDLC film layup to define a first section of the PDLC film layup and a second section of the PDLC film layup to expose the PDLC layer;
    applying an electrically conductive adhesive material onto and in disproportionately length portions with respect to the first and second sections of the PDLC film layup;
    superimposing and directly coupling a plurality of mesh anchors to the disportionally length portions of the electrically conductive adhesive material applied to the first and second sections of the PDLC film layup;
    superimposing, directly coupling, and adhesively coupling a first strip of an electrically conductive material to the first section of the PDLC film layup;

superimposing, directly coupling, and adhesively coupling a second strip of an electrically conductive material to the second section of the PDLC film layup; and directly coupling a positive lead wire to an outer strip surface of the first strip and a negative lead wire to an outer strip surface of the second strip.

10. The method according to claim 9, further comprising:
removing excess liquid crystals from the first and second sections with an abrasive cloth material.

11. The method according to claim 9, further comprising: removing the strip of the at least one of the two ITO layers, having a uniform strip width of approximately 5 mm, to define the first and second sections of the PDLC film layup.

12. The method according to claim 9, further comprising: applying an electrically conductive ink layer to the exposed PDLC layer and on the first and second sections of the PDLC film layup.

13. The method according to claim 9, wherein:
the electrically conductive adhesive is formed from silver.

14. The method according to claim 9, wherein: the plurality of mesh anchors are made of a copper material.

\* \* \* \* \*